June 29, 1954     P. W. HERRLINGER     2,682,171
TAPE TESTING DEVICE
Filed Aug. 9, 1952                             2 Sheets-Sheet 1
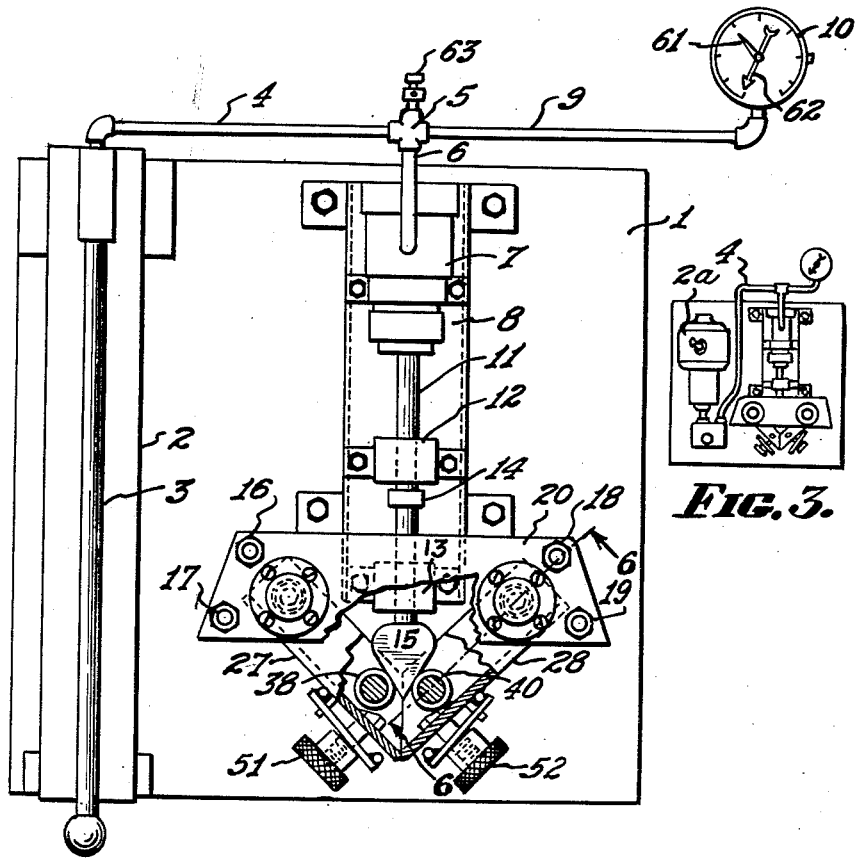
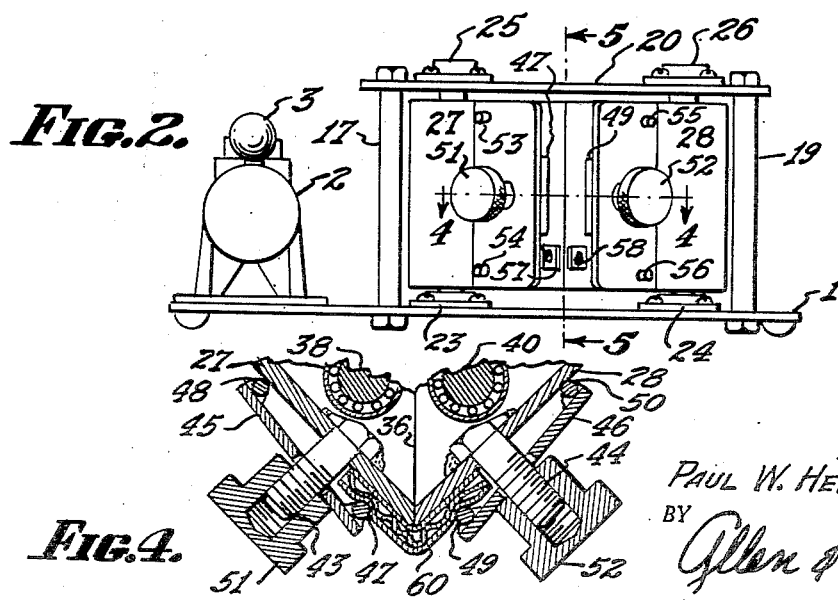
INVENTOR.
PAUL W. HERRLINGER,
BY
ATTORNEYS.

June 29, 1954
P. W. HERRLINGER
2,682,171
TAPE TESTING DEVICE
Filed Aug. 9, 1952
2 Sheets-Sheet 2
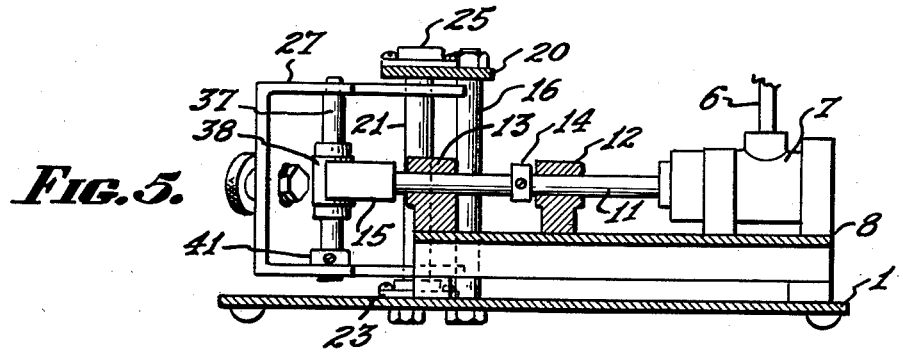
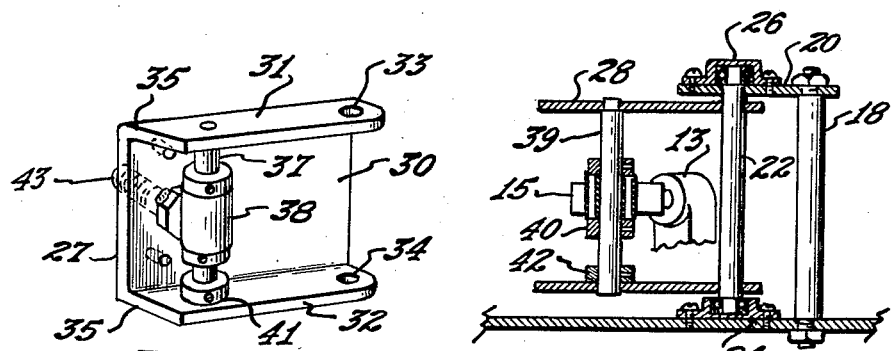
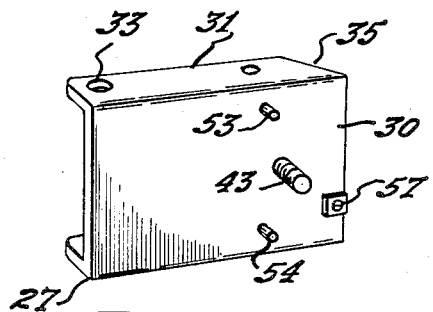
INVENTOR.
PAUL W. HERRLINGER,
BY
Allen & Allen
ATTORNEYS.

Patented June 29, 1954

2,682,171

UNITED STATES PATENT OFFICE 2,682,171

TAPE TESTING DEVICE

Paul W. Herrlinger, Troy, Ohio, assignor to The Gummed Products Company, Troy, Ohio, a corporation of Ohio Application August 9, 1952, Serial No. 303,515

7 Claims. (Cl. 73—102)

My invention has to do with a tape testing device and relates particularly to a device for testing the bursting strength of stay tape under conditions simulating its use in the corner construction of a boxboard carton.

In the manufacture of boxboard cartons, particularly shipping containers and the like made of corrugated board, it is customary to form the container body from a blank having four body walls in articulation, the body walls being tubed by bringing their free edges together and applying a strip of stay tape to contiguous marginal portions of the adjoining body walls. The corner construction so provided is known in the trade as a manufacturer's joint.

It has been found that the contents of a carton during handling and shipping will exert outwardly directed forces against the walls of the carton, which while they may not be sufficient to burst the walls of the carton, will at times be sufficient to split or burst the stay tape forming the manufacturer's joint. This is particularly true in larger cartons having substantial volume and packed full of relatively heavy objects, such as canned goods.

While various types of devices have been devised for testing the tensile strength of a length of stay tape by measuring the force required to break the tape, there has, to my knowledge, never been a device provided which would test the bursting strength of stay tape under conditions simulating its use in the manufacturer's joint of a boxboard carton, wherein the tape extends around a corner of the carton and the forces tending to burst the tape are directed against the walls of the carton.

It is, therefore, a principal object of my invention to provide a device which will test the bursting strength of stay tape under conditions simulating those encountered during the actual use of the stay tape in the corner construction of a carton, thereby enabling me to accurately determine the strength and performance characteristics of a given tape under conditions of actual usage.

It is another object of my invention to provide a tape testing device of the character described wherein the bursting force applied to the tape can be increased in a constant and uniform manner so as to accurately determine the exact amount of force required to burst the tape.

These and other objects which will appear hereinafter or which will be apparent to one skilled in the art upon reading these specifications, I accomplish by that construction and arrangement of parts of which I shall now describe certain exemplary embodiments. Reference is now made to the accompanying drawings, wherein:

Figure 1 is a plan view of my testing device.

Figure 2 is a front elevation of the device illustrated in Figure 1.

Figure 3 is a plan view similar to Figure 1 illustrating the use of a power driven pressure pump.

Figure 4 is a sectional view taken along the line 4—4 of Figure 2.

Figure 5 is a sectional view taken along the line of 5—5 of Figure 2.

Figure 6 is a sectional view taken along the line 6—6 of Figure 1.

Figure 7 is a perspective view from the rear illustrating one of the arms of my device.

Figure 8 is a perspective view from the front of the arm illustrated in Figure 7.

Referring now to Figure 1, my device comprises a platform 1 on which is mounted a pressure pump 2 having a pumping handle 3. A connection 4 extends from the pump 2 to the joint 5 where an extension 6 of the connection leads to the cylinder 7 mounted on a stand 8 fixed to the platform 1. A further extension 9 of the connection 4 extends from the joint 5 and carries a pressure gauge 10 on its free end.

A piston (not shown), is fitted in the cylinder 7 and has a rod 11 extending outwardly therefrom, the rod 11 being slidably journaled in the guide bearings 12 and 13. A collar 14 is fixed to the rod 11 intermediate the guide bearings 12 and 13 to limit the movement of the rod. The free end of the rod extends beyond the guide bearing 13 and carries a wedge-shaped member 15 adapted to contact the pivoting arms now to be described.

Mounted adjacent the end of the rod 11 are spaced pairs of supporting rods 16, 17 and 18, 19 which extend upwardly from the platform 1 and support horizontally disposed plate 20. Pivoted rods 21 and 22 extend between the platform 1 and the plate 20, the rods 21 and 22 being journaled at their ends in ball-bearing fittings 23 and 24 secured to the platform 1 and the ball-bearing caps 25 and 26 secured to the plate 20. An arm 27 is fixedly secured to the rod 21 and an arm 28 is fixedly secured to the rod 22. The arms 27 and 28, being fixed respectively to the pivoted rods 21 and 22, are free to swing relative to each other and are dimensioned to come into edge-to-edge contacting relationship, in which condition the arms lies at substantially right angles to each other.

As can be best seen in Figures 7 and 8, each of the arms comprises a planar body portion 30, an upper inwardly directed flange 31 and a lower inwardly directed flange 32, the flanges 31 and 32 having openings 33 and 34 therein to snugly receive the pivoted rods 21 or 22. The ends of the arms which come into edge-to-edge contact are cut-back, as at 35 at an angle of approximately 45°, so that when the arms are in edge-to-edge relation, they will lie in abutting relation throughout their common widths, as most clearly seen in Figure 4 of the drawings wherein the abutting edges of the arms 27 and 28 are represented by the reference numeral 36. Each of the arms additionally carries a supporting rod extending between the flanges 31 and 32 and mounting a roller-bearing assembly. Thus, the arm 27 carries the supporting rod 37 and roller bearing assembly 38, and the arm 28 carries the supporting rod 39 and roller bearing assembly 40. The supporting rods 37 and 39 are fixed to the arms by means of collars 41 and 42, respectively. The roller bearing assemblies 38 and 40 are so positioned on the rods 37 and 39 that they will be contacted by the wedge-shaped member 15.

Each of the arms is provided with a clamping device for clamping test strip of boxboard to the outer surface or face of the arm. To this end, threaded screws 43 and 44 extend outwardly from the faces of the arms and clamping plates 45 and 46 are fitted over the screws in the manner best seen in Figure 4 of the drawings. Plates 45 and 46 have projections 47, 48 and 49, 50 extending inwardly from their opposite edges, and the clamping plates are adapted to be moved towards the arms by means of the knurled clamping nuts 51 and 52. In addition, guide pins 53, 54 and 55, 56 are provided extending outwardly from the arms and through the clamping plates to maintain the latter in proper alignment. Stop members 57 and 58 are also provided on the faces of the arms against which the bottoms of the test strips may rest to secure proper alignment thereof.

In the operation of my device, a length of stay tape is secured over the adjacent edges of boxboard test strips to simulate the manufacturer's joint in a boxboard carton, whereupon the arms of the testing device are closed so that they lie in edge-to-edge relationship. The test strips are then clamped to the arms of the device, as indicated generally at 60 in Figure 4. The test strips are clamped against the faces of the arms by means of the clamping plates 45 and 46 which are drawn towards the arms by means of the clamping nuts 51 and 52. As the clamping plates are moved inwardly, the extensions 48 and 50 come into contact with the faces of the arms 27 and 28 and the extensions 47 and 49 bite into the test strips causing them to be securely clamped to the arms. Next, the pressure pump 2 is used to build up pressure in the cylinder 7, the pressure causing the piston and its rod 11 to move outwardly, thereby causing the wedge-shaped member 15 to bear against the roller bearing assemblies 38 and 40 to force the arms 27 and 28 apart. Pressure is built up in the cylinder 7 until sufficient force is applied to the arms to cause the tape to burst. The amount of pressure required to do this is registered on the pressure gauge 10, the gauge 10 preferably including an indicating arm 61 which will follow the ordinary spring biased indicating arm 62 but will not spring back when the pressure is released, thus giving a positive reading of the pressure necessary to burst the tape. Preferably, a vent valve, such as the valve 63 is provided in the connection between the pressure pump 2 and the cylinder 7 to vent the system.

It will be noted that the relationship of the arms of my device simulates the angular corner of a box, and that the separating movement of the wedge-shaped member 15 forces the arms apart in the same fashion as the contents of a filled carton would tend to rupture the stay-tape bridging the carton corner. By gradually building up the pressure in the system until the tape is ruptured, an extremely accurate measure of the bursting strength of the tape can be obtained. While for most uses I have found that a hand pump such as illustrated in Figure 1 of the drawings is satisfactory, it is also within the spirit of my invention to provide a motor driven pressure pump, such as illustrated at 2a in Figure 3 of the drawings, thereby assuring the constant and uniform application of pressure to the cylinder and valve mechanism.

Having thus described my invention in certain exemplary embodiments, and indicating that modifications may be made in my invention without departing from the spirit of it, what I desire to secure and protect by Letters Patent is:

1. In a device for testing the bursting strength of stay-tape under conditions simulating its use in the corner construction of boxboard cartons, a pair of arms supported for swinging movement relative to each other, said arms being movable to edge-to-edge contacting relationship and adapted to lie at substantially right angles to each other, means on said arms for clamping boxboard test strips, the adjacent edges of which are connected by stay tape, to said arms with the stay tape bridging the contacting edges of said arms, whereby to simulate the corner construction of a boxboard carton, force applying means contacting said arms to cause their separation and thereby place the stay tape securing the test strips together under tension, said force applying means being adapted to apply an ever increasing force to said arms until said stay tape is caused to rupture, and means connected to said force applying means for measuring the amount of force applied to said arms.

2. In a testing device for the purposes described, a platform, a pair of arms supported on said platform and mounted for pivotal movement about parallel axes, said arms normally lying in edge-to-edge relationship in angularly related planes, means on said arms for clamping boxboard test panels, the edges of which are connected by gummed tape, to said arms with the stay-tape bridging the contacting edges of said arms, a cylinder mounted on said platform, said cylinder including a piston having a piston rod extending outwardly from said cylinder in the direction of said arms, a wedge-shaped member on the free end of said rod contacting said arms, and adapted, when said piston is moved outwardly relative to said cylinder, to press against said arms to cause them to move apart.

3. In a device for testing the bursting strength of stay-tape under conditions simulating its use in the corner construction of boxboard cartons, a pair of arms supported for swinging movement relative to each other, said arms being movable to edge-to-edge contacting relationship and adapted to lie at substantially right angles to each other, means on said arms for clamping boxboard test strips, the adjacent edges of which are connected by stay-tape, to said arms with the stay-tape bridging the contacting edges of said arms, whereby to simulate the corner construction of a boxboard carton, force supplying means contacting said arms to cause their separation, thereby placing the stay-tape secured to the test strips under tension, said force supplying means including a fluid actuated piston having a piston rod extending in the direction of said arms, and a wedge-shaped member on the end of said rod contacting said arms, said wedge-shaped member acting, upon outward movement of the piston rod, to separate said arms and thereby cause said stay-tape to rupture, and means connected to said force supplying means for measuring the amount of force required to rupture the stay-tape.

4. In a device for testing the bursting strength of stay-tape under conditions simulating its use in the corner construction of boxboard cartons, a pair of arms supported for swinging movement relative to each other, said arms being movable to edge-to-edge contacting relationship and adapted to lie at substantially right angles to each other, means on said arms for clamping boxboard test strips, the adjacent edges of which are connected by stay-tape, to said arms with the stay-tape bridging the contacting edges of said arms, whereby to simulate the corner construction of a boxboard carton, force supplying means contacting said arms to cause their separation and thereby place the stay-tape securing the test strips together under tension, said force supplying means including a fluid actuated piston having a piston rod extending in the direction of said arms, and a wedge-shaped member on the end of said rod contacting said arms, said arms each including rearwardly extending flanges mounting a roller bearing positioned to be contacted by a face of said wedge-shaped member, said wedge-shaped member acting, upon forward movement of said piston rods, to separate said arms and thereby cause said stay-tape to rupture, and means connected to said force supplying means for measuring the amount of force required to rupture the stay-tape.

5. In a testing device for the purposes described, a platform, a pair of arms supported on said platform and mounted for pivotal movement about parallel axes, said arms normally lying in edge-to-edge relationship in angularly related planes, means on said arms for clamping boxboard test panels, the edges of which are connected by gummed tape, to said arms with the gummed tape bridging the contacting edges of said arms, a cylinder mounted on said platform, said cylinder including a piston having a piston rod extending outwardly from said cylinder in the direction of said arms, a pressure pump mounted on said platform and operatively connected to said cylinder so as to apply fluid pressure thereto acting to thrust said piston rod outwardly relative to said cylinder, a head on the free end of said rod contacting said arms and adapted, when said piston rod is moved outwardly, to press against said arms to cause them to move apart, and a pressure gauge connected to said pump for determining the amount of pressure applied to said piston and hence to said arms.

6. In a device for testing the bursting strength of stay-tape under conditions simulating its use in the corner construction of boxboard cartons, a pair of arms supported for swinging movement relative to each other, said arms being movable to edge-to-edge contacting relationship and adapted to lie in angularly related planes, means on said arms for clamping boxboard test strips, the adjacent edges of which are connected by stay-tape, to said arms with the stay-tape bridging the contacting edges of said arms, whereby to simulate the corner construction of a boxboard carton, means acting to separate said arms and thereby apply bursting forces to said stay-tape, and additional means connected to said first named means for measuring the amount of bursting force applied to said stay-tape.

7. In a device for testing the bursting strength of stay-tape under conditions simulating its use in the corner construction of boxboard cartons, a pair of test strip supports mounted for movement relative to each other, said supports normally lying in edge-to-edge contacting relationship in angularly related planes so as to simulate the corner edge of a carton, means on said supports for clamping boxboard test strips, the adjacent edges of which are connected by stay-tape, to said supports with the stay-tape bridging the contacting edges thereof, actuating means contacting said supports to cause them to move apart and thereby apply bursting forces to the stay-tape, and measuring means connected to said actuating means for measuring the amount of force required to burst the stay-tape.

References Cited in the file of this patent

UNITED STATES PATENTS

| Number | Name | Date |
|---|---|---|
| 1,715,093 | McLaurin | May 28, 1929 |
| 1,920,039 | Thwing | July 25, 1933 |
| 2,001,711 | Dinzl | May 21, 1935 |
| 2,329,599 | Flaws, Jr. | Sept. 14, 1943 |